United States Patent
Reed et al.

(10) Patent No.: US 9,051,006 B2
(45) Date of Patent: Jun. 9, 2015

(54) METHOD AND APPARATUS FOR VEHICLE AUTO-GUIDANCE

(75) Inventors: Keith Reed, East Bethel, MN (US); Michael John Gomes, Rancho Murieta, CA (US)

(73) Assignee: TSD Integrated Controls, LLC, Livermore, CA (US)

( * ) Notice: Subject to any disclaimer, the term of this patent is extended or adjusted under 35 U.S.C. 154(b) by 1231 days.

(21) Appl. No.: 11/899,899

(22) Filed: Sep. 6, 2007

(65) Prior Publication Data

US 2009/0069967 A1    Mar. 12, 2009

(51) Int. Cl.
*B62D 1/28* (2006.01)

(52) U.S. Cl.
CPC ..................... *B62D 1/286* (2013.01)

(58) Field of Classification Search
USPC ............ 701/23, 41, 43, 44, 50; 180/404, 443, 180/444, 446, 273
See application file for complete search history.

(56) References Cited

U.S. PATENT DOCUMENTS

| | | | |
|---|---|---|---|
| 2,805,585 A | 9/1957 | Besserman | |
| 4,170,953 A | 10/1979 | Pounder et al. | |
| 4,453,485 A | 6/1984 | Houghton-Brown et al. | |
| 5,121,799 A | 6/1992 | Barnes et al. | |
| 5,373,911 A * | 12/1994 | Yasui | 180/168 |
| 6,082,482 A * | 7/2000 | Kato et al. | 180/402 |
| 6,198,992 B1 * | 3/2001 | Winslow | 701/23 |
| 6,314,348 B1 * | 11/2001 | Winslow | 701/23 |
| 6,738,695 B1 * | 5/2004 | Motz et al. | 701/23 |
| 7,191,061 B2 * | 3/2007 | McKay et al. | 701/23 |
| 7,363,154 B2 * | 4/2008 | Lindores | 701/26 |
| 7,574,290 B2 * | 8/2009 | Gibson et al. | 701/26 |
| 2004/0262063 A1 | 12/2004 | Kaufmann et al. | |
| 2005/0092542 A1 * | 5/2005 | Turner | 180/446 |
| 2005/0205337 A1 | 9/2005 | Porskrog et al. | |
| 2006/0064216 A1 | 3/2006 | Palmer | |
| 2007/0078578 A1 | 4/2007 | Liaw et al. | |

FOREIGN PATENT DOCUMENTS

| | | |
|---|---|---|
| DE | 19922284 A1 | 11/1999 |
| DE | 102004057262 A1 | 1/2006 |
| EP | 1527977 A2 | 5/2005 |
| EP | 1650101 A2 | 4/2006 |
| JP | 6336170 A | 12/1994 |
| JP | 2004351999 A | 12/2004 |

OTHER PUBLICATIONS

International Search Report corresponding to International Application No. PCT/US2008/007561 filed Jun. 18, 2008 (2 pages).
Written Opinion of the International Searching Authority corresponding to International Application No. PCT/US2008/007561 filed Jun. 18, 2008 (3 pages).

* cited by examiner

*Primary Examiner* — Nicholas Kiswanto
(74) *Attorney, Agent, or Firm* — Chiesa Shahinian & Giantomasi PC

(57) ABSTRACT

Methods and apparatus are disclose for auto-steering of an auto-guided vehicle. A sensor coupled to a steering shaft detects when an operator requests control of the vehicle. The sensor then transmits information indicative of the request to one or more controllers of an auto-guidance system, which initiates a shutdown of auto-steering functions. In this way, the system quickly reverts to manual steering in an automatically guided and steered vehicle.

15 Claims, 2 Drawing Sheets

METHOD AND APPARATUS FOR VEHICLE AUTO-GUIDANCE

FIELD OF THE INVENTION

The present invention relates generally to automatically guided vehicles and more particularly to automatic steering of automatically guided vehicles.

BACKGROUND OF THE INVENTION

Automatic vehicle guidance (i.e., auto-guidance) systems have been used to guide equipment (e.g., vehicles) over a desired path. Such auto-guidance systems are increasingly used for controlling many different types of agricultural and other similar equipment where following a previously defined route is desirable. This allows more precise control of the vehicles than is typically realized if the vehicle is steered by a human.

However, it may sometimes be necessary to wrest control of the vehicle from the auto-guidance system (e.g., in case of emergency or obstacle). In such cases, auto-guidance and steering systems must be capable of detecting an operator's request for control of the vehicle. Various methods and apparatus exist for detecting such a request.

Currently, in some cases, a pressure sensor is placed on the hydraulic steering load-sense line of the vehicle. The pressure sensor detects a change in pressure as the operator turns a steering wheel. The pressure change is transmitted as an electrical signal to a steering controller, which disables the auto-steering functions of the auto-guidance system.

This method is deficient in that pressure spikes and/or drops may be caused on the steering load-sense line by outside influence (e.g., changes in the work environment, pressure variations, etc.). These pressure variations may be misinterpreted by the pressure sensor as an attempt to gain manual control of the vehicle. This false detection can prematurely shut down the auto-steering system.

In other cases, a manual steering system that is stronger than the auto-steering system is used. When the operator engages the steering wheel, the stronger manual steering system will overpower the auto-steering system and allow the operator to steer the vehicle off the intended auto-guidance course. If the operator steers the vehicle sufficiently off course (as determined by a Global Positioning System (GPS) unit, control parameters, etc.), the auto-guidance system will disengage the auto-steering function.

This method is deficient in that the operator must fight the auto-steering system until the vehicle is sufficiently off course. The amount of effort, time, and distance off course required to precipitate a disengagement of the auto-steering function varies according to control parameters, but may be significant.

Therefore, alternative components and methods are required to detect operator input and invoke shutdown of the auto-steering function of auto-guidance systems.

BRIEF SUMMARY OF THE INVENTION

The present invention provides improved methods and apparatus for auto-steering of a vehicle. In accordance with an embodiment of the invention, a method of steering an auto-guided vehicle includes detecting manual steering input using a steering sensor coupled to a steering shaft of the vehicle and disabling automatic steering of the vehicle in response to detecting manual steering input. The method also includes initiating automatic steering of the auto-guided vehicle prior to detecting manual steering input, transmitting information about the detected manual steering input to a controller adapted to disable automatic steering of the vehicle, and ceasing sending automatic steering control signals.

In other embodiments, an automatically steered vehicle includes a steering shaft, a steering sensor coupled to the steering shaft and adapted to detect a manual steering input. When manual steering input is detected, an auto-guidance system is disabled. In such a vehicle, the sensor could be a rotary sensor or a torque sensor. The vehicle also has a steering wheel coupled to the steering shaft, a controller to transmit automatic steering control signals, and a steering controller to receive the steering control signals and automatically steer the vehicle.

These and other advantages of the invention will be apparent to those of ordinary skill in the art by reference to the following detailed description and the accompanying drawings.

DETAILED DESCRIPTION

The present invention generally provides methods and apparatus for auto-steering of an auto-guided vehicle. Specifically, the present invention provides a sensor to detect when an operator requests manual control of the vehicle. The sensor then transmits information indicative of the request to one or more controllers of an auto-guidance system, which initiates a shutdown of auto-steering functions. In this way, the present invention provides an improved technique for reverting to manual steering in an automatically guided and steered vehicle.

Automatic vehicle guidance (i.e., auto-guidance) and the automatic steering functions (i.e., auto-steering) of auto-guidance are well known and will only be discussed in detail herein as is related to the present invention. It may be understood by one of skill in the art that various related and/or alternative methods and apparatus related to auto-guidance and auto-steering may be employed in connection with the invention described below.

Figure 1:
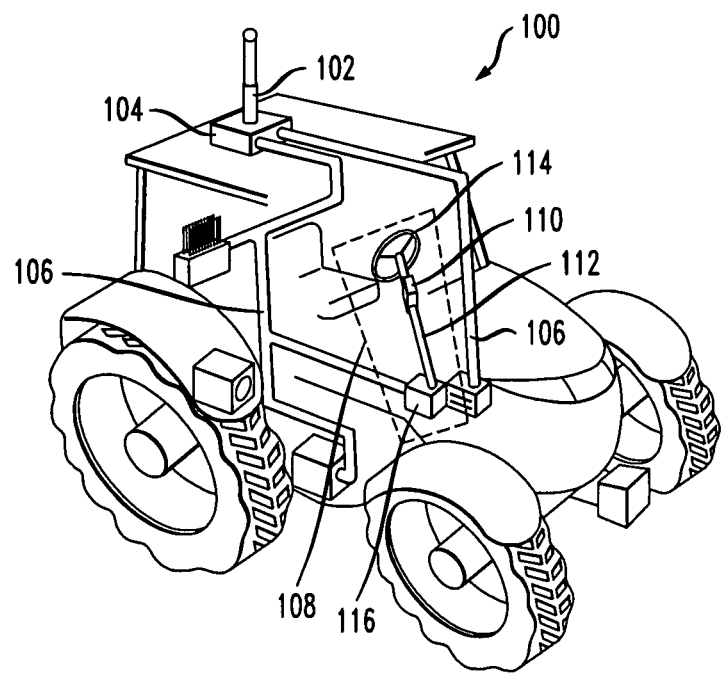
FIG. 1 shows a vehicle for auto-guidance according to an embodiment of the present invention.
Figure 2:
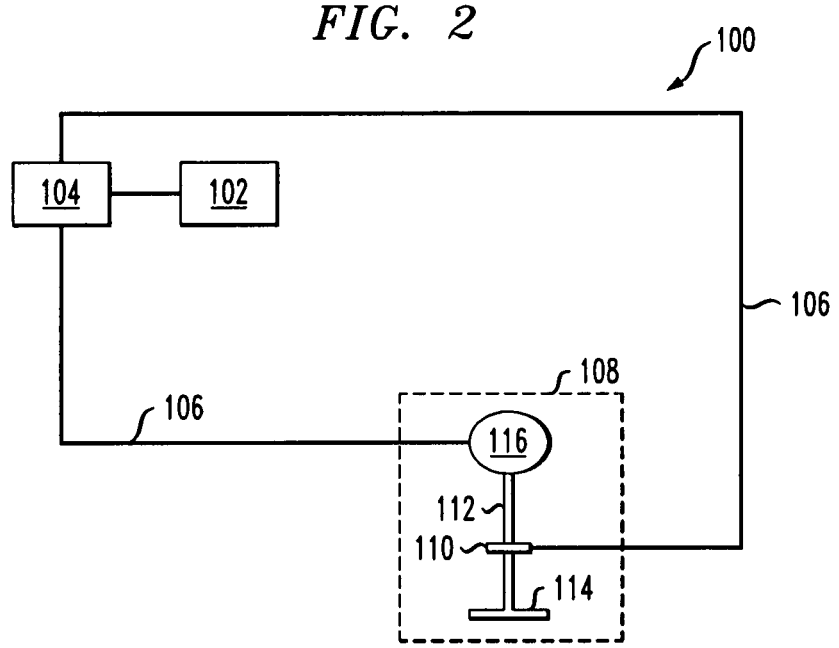
FIG. 2 is a schematic depiction of a portion of an auto-guidance system for a vehicle according to an embodiment of the present invention.

FIGS. 1 and 2 depict an automatically guided vehicle 100. FIG. 1 is an exemplary vehicle 100. FIG. 2 is a schematic diagram of connection layout of the vehicle 100 according to one embodiment of the invention.

The vehicle 100 comprises a satellite positioning receiver 102 and a master controller 104. The satellite positioning receiver 102 and the master controller 104 may be coupled and/or be in communication with each other via a communications network 106. The vehicle further comprises a steering unit 108. The steering unit 108 has a steering sensor 110 coupled to the communications network 106 and a steering shaft 112, which is in turn coupled to a steering wheel 114. Vehicle 100 also includes a steering controller 116, which may be part of steering unit 108 or may be reside elsewhere on vehicle 100.

The steering unit 108, the steering sensor 110, the steering controller 116, and/or the other known components may similarly be coupled and/or be in communication via the communications network 106. Though not shown explicitly in FIGS. 1 and 2, other well known components and/or connections used in a vehicle auto-guidance system may be employed in connection with vehicle 100 and steering unit 108. Appropriate general purpose components (e.g., motors, shafts, hydraulics, other sensors, etc.) are known to those skilled in the art, and are not described in detail herein.

The satellite positioning receiver 102 may be any device capable of receiving satellite signals and generating position information based on the received signals. Such devices include Global Navigation Satellite System (GNSS) receivers, Global Positioning System (GPS) receivers, antennas, and the like. Additionally or alternatively, alternate positioning receivers, such as Long Range Navigation (LORAN) or Enhanced LORAN receivers, may be used in place of or in combination with satellite positioning receivers. Further discussion is directed to satellite positioning receivers, though any appropriate positioning receivers may be used.

The satellite positioning receiver 102 may use the received satellite signals to determine a position (e.g., a position of the vehicle, a position of the receiver, etc.) and/or may pass the signals to another device, such as the master controller 104 via the communications network 106, where position information may be determined.

The master controller 104 may generate vehicle guidance and/or auto-guidance control signals based on the position information and other stored information. The master controller 104 may send these signals via communications network 106 to components of steering unit 108, specifically steering controller 116, and/or any other component used in the guidance and/or control of the vehicle 100. Such vehicle guidance signals may be signals used in auto-guidance of the vehicle 100 in accordance with known auto-guidance methods and/or the auto-guidance method 300 of FIG. 3.

Additionally, the master controller 104 may receive feedback and/or information signals from the various components of vehicle 100. Particularly, the master controller 104 may receive position information from the satellite positioning receiver 102, steering angle information from the steering component 110, steering control information from the steering controller 116, and/or other signals in a vehicle auto-guidance system.

Communications network 106 may be a communications bus, such as a Controlled Area Network (CAN) bus or a serial bus (e.g., a RS232 serial bus). In some embodiments, the communications network 106 may comprise a wireless communications network via Bluetooth, Wi-Fi, General Packet Radio Service (GPRS), WLAN, or another wireless technique. Similarly, communications network 106 may comprise a parallel data connection. In some embodiments, the communications network 106 may incorporate more than one communication technique. For example, the master controller 104 and the steering controller 116 may be connected over communications network 108 via a CAN bus while the steering sensor 110 may transmit information to the master controller 104 over the communications network 106 using a direct electrical connection. Other combinations of communications technologies may be used similarly.

Steering sensor 110 may be mounted to steering shaft 112, mounted in-line with steering shaft 112, or may be mounted in another appropriate manner and may be a sensor capable of determining a steering angle of the vehicle 100. Steering sensor 110 may be any appropriate type of sensor capable of detecting movement in steering unit 108, specifically steering shaft 112, such as a torque sensor, angular sensor, or rotary sensor. Similarly, steering wheel 114 may be coupled to steering shaft 112 such that when the steering wheel 114 is turned by an operator, the steering shaft 112 is turned proportionately and the steering sensor 110 may register such movement. Though depicted in FIG. 1 as a steering shaft 112 coupled directly to steering wheel 114 and steering controller 116, it may be understood that steering shaft 114 may comprise one or more steering linkages or other steering components as is known in the art and direct connection may not be required.

Steering controller 116 may be capable of receiving control signals from the master controller 104 and steering and/or controlling movement of vehicle 100. That is, steering controller 116 may comprise one or more components used in an auto-steering function of an auto-guided vehicle. Similarly, steering controller 116 may also be capable of receiving control signals from master controller 104 and/or another source (e.g., steering sensor 110) to engage and/or disengage auto-steering and/or auto-guidance of vehicle 100.

In some embodiments, the satellite positioning receiver 102, the master controller 104, components of steering unit 108, and/or steering controller 116 may be implemented on and/or may include any components or devices that are typically used by, or used in connection with, a computer or computer system. Although not explicitly pictured in FIG. 1, the satellite positioning receiver 102, the master controller 104, the steering unit 108, and/or the steering controller 116 may include one or more central processing units, read only memory (ROM) devices and/or random access memory (RAM) devices. The satellite positioning receiver 102, the master controller 104, the steering unit 108, and/or the steering controller 116 may also include one or more databases for storing any appropriate data and/or information such as position or location information, auto-guidance control routines and commands, and vehicle steering information, one or more programs or sets of instructions for executing methods of the present invention, and/or any other computer components or systems, including any peripheral devices.

According to some embodiments of the present invention, instructions of a program (e.g., controller software) may be read into a memory of the satellite positioning receiver 102, the master controller 104, the steering unit 108, and/or the steering controller 116 from another medium, such as from a ROM device to a RAM device or from a LAN adapter to a RAM device. Execution of sequences of the instructions in the program may cause the satellite positioning receiver 102, the master controller 104, the steering unit 108, and/or the steering controller 116 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory may store the software for the controller, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system and device drivers for allowing the controller to interface with computer peripheral devices and other equipment/components. Appropriate general purpose program elements are known to those skilled in the art, and need not be described in detail herein.

Figure 3:
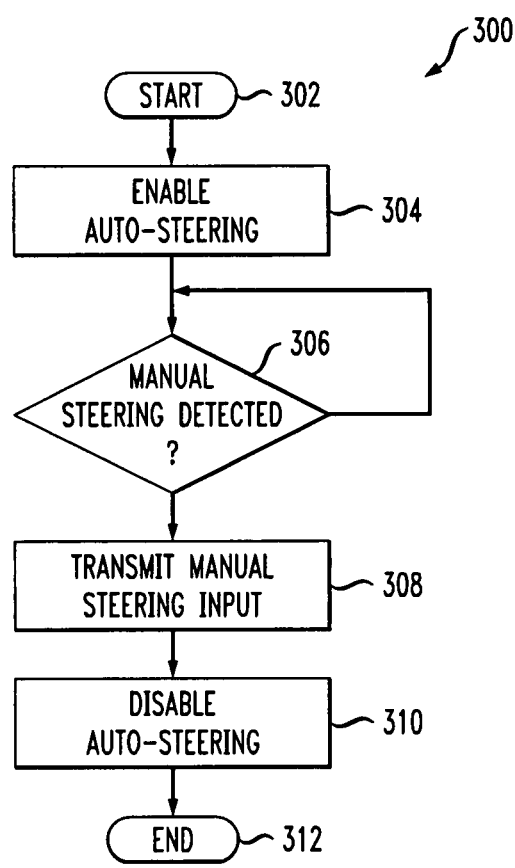
FIG. 3 shows a flowchart of a method of vehicle operation according to an embodiment of the present invention.

In operation, the vehicle 100 may perform a method 300 of auto-guidance as depicted in FIG. 3. The method begins at step 302.

In step 304, auto-steering function is initiated. Auto-steering functions may be part of an auto-guidance system and/or an auto-guidance control routine. Steering controller 116 may receive control signals from master controller 104 and may, in turn, direct steering of the vehicle 100. In some embodiments, this may be accomplished by asserting control over steering shaft 112 and auto-steering the vehicle in so-called reaction type steering. Alternatively, the steering controller 116 may decouple the steering shaft 112 during auto-steering such that the steering shaft 112 (and, by extension, the steering wheel 114) does not turn in response to any steering and/or turning during auto-steering. This is commonly referred to as non-reaction type steering.

In step 306, it is determined if manual steering input has been detected. Manual steering input may occur when an operator turns steering wheel 114 during auto-steering. An operator may attempt to revert to manual steering in case of emergency, to avoid an obstacle, etc. When the steering wheel 114 is turned, the steering shaft 112 may also be turned. Since the steering sensor 110 is mounted in such a way as to detect movement of the steering shaft 112 as described above, the steering sensor 110 would readily (e.g., immediately) detect the manual steering input.

In reaction type steering, the steering sensor 110 may detect any movement of the steering shaft 110 which is greater than expected. That is, since the steering shaft 112 and steering wheel 114 turn in response to steering of the vehicle 100 in auto-steering and in the regular course of driving (e.g., minor course corrections, bumps, wheel movement, etc.), the steering sensor 110 may be adapted to detect a steering shaft 110 movement which exceeds a threshold indicating manual steering input has been entered.

In non-reaction type steering, the steering shaft 112 is decoupled from steering unit 108 and/or steering controller 116 during auto-steering. Consequently, the threshold which indicates manual input detected by the steering sensor 110 may be lower than in reaction type steering. That is, there may be some amount of inadvertent movement detected by the steering sensor 110 which is below an amount that indicates manual steering input.

If manual steering input is detected in step 306, the method passes to step 308. If not, control is returned to step 306 to continue waiting for manual steering input.

In step 308, manual steering input information is transmitted. The steering sensor 110 may on its own or in connection with the steering unit 108 transmit detected manual steering input information to other components, such as master controller 104 and/or other controllers (e.g., steering controller 116). As discussed above with respect to step 306, the steering sensor 110 may detect all movement of the steering shaft 112, but may only transmit signals indicative of manual steering input to master controller 104 when the amount of steering (e.g., the angle through which the steering shaft 112 has been turned) exceeds a predetermined threshold value. Alternatively, steering sensor 110 may transmit all steering angle changes to master controller 104 and/or steering controller 116 and these controllers may determine if manual steering input has been entered.

In step 310, auto-steering is disabled in response to detecting manual steering input. Upon receipt of signals indicative of a manual steering input from the steering sensor 110 or another source as transmitted in step 308, the master controller 104 and/or the steering controller 116 may disable auto-steering. This may be accomplished by ceasing sending auto-guidance and/or auto-steering control signals to the steering unit 108 and/or steering controller 116 or by suspending the signals such that if manual steering is relinquished, the auto-steering function may be brought back online quickly. This alternative may be useful in that an operator may manually steer the vehicle 100 via the steering wheel 114 around an obstacle, but may let go of the steering wheel 114 after passing the obstacle allowing the auto-guidance system to re-initiate auto-steering and course correction quickly to bring the vehicle 100 back into the originally intended path.

The method ends at step 312.

In exemplary embodiments, the systems, apparatus, and methods described herein may be used in auto-guidance and auto-steering of agricultural vehicles such as tractors, harvesters, sprayers, combines, etc. Though described above in relation to control of an auto-steering system, the addition of steering sensor 110 may have additional useful features and functions. The steering sensor 110 may pass steering angle, rate of angular change, and/or other appropriate information to the master controller and/or the steering controller 116. Such information may be used by the master controller and/or the steering controller 116 to enhance turning aggressiveness of the vehicle 100 during non-auto-steering operation. In this way, variable rate steering control may be employed. Variable rate steering control may allow the vehicle 100 to operate similarly to a standard automobile, which may increase handling and/or ease of use and deliver a more comfortable work environment.

The foregoing description discloses only particular embodiments of the invention; modifications of the above disclosed methods and apparatus which fall within the scope of the invention will be readily apparent to those of ordinary skill in the art. For instance, it will be understood that, though discussed primarily as a steering sensor coupled in-line with a steering shaft above, the steering sensor may employed and/or located anywhere in the steering unit 108 and/or elsewhere on the drive-train of the vehicle 100 in order to achieve the same functions. Additionally, though discussed in the method steps as separate units, the satellite positioning system and master controller may be one unit and their functions within the method may this be merged. Similarly, other components may perform the functions of method 300 even when not explicitly discussed.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:
1. A method of steering an auto-guided vehicle comprising:
during reaction type steering of the auto-guided vehicle in which a steering shaft of the auto-guided vehicle is coupled to an auto-steering controller of the auto-guided vehicle, detecting a first manual steering input based on a detected first movement of the steering shaft exceeding a first predetermined limit;

disabling a first automatic steering of the auto-guided vehicle in response to the first manual steering input;

during non-reaction type steering in which the steering shaft of the auto-guided vehicle is decoupled from the auto-steering controller, detecting a second manual steering input based on a detected second movement of the steering shaft exceeding a second predetermined limit indicating the second manual steering input, the second predetermined limit being less than the first predetermined limit, using a steering sensor coupled to the steering shaft; and disabling a second automatic steering of the auto-guided vehicle in response to the second manual steering input.

2. The method of claim 1 further comprising:

initiating the first automatic steering of the auto-guided vehicle prior to detecting the first manual steering input; and initiating the second automatic steering of the auto-guided vehicle prior to detecting the second manual steering input.

3. The method of claim 1 wherein the auto-steering controller is adapted to disable automatic steering of the vehicle, the method further comprising:

transmitting first information about the detected first manual steering input to the auto-steering controller; and transmitting second information about the detected second manual steering input to the auto-steering controller.

4. The method of claim 3, wherein transmitting the first information to the auto-steering controller comprises transmitting:

a value of a first angle through which the steering shaft is turned;

a rate of a change of the value of the first angle through which the steering shaft is turned; and wherein transmitting the second information comprises transmitting:

a value of a second angle through which the steering shaft is turned; and a rate of a change of the value of the second angle through which the steering shaft is turned.

5. The method of claim 1 wherein disabling the second automatic steering of the vehicle in response to detecting the second manual steering input further comprises ceasing sending automatic steering control signals.

6. The method of claim 5, wherein ceasing sending automatic steering control signals comprises ceasing sending automatic steering control signals such that, upon detecting that manual steering is relinquished, the automatic steering of the vehicle is reinstated.

7. The method of claim 1, wherein the first movement of the steering shaft comprises a first angle through which the steering shaft is turned and wherein the second movement of the steering shaft comprises a second angle through which the steering shaft is turned.

8. A vehicle comprising:

a steering shaft; and an auto-steering controller configured to control an automatic steering of the vehicle; and a steering sensor coupled to the steering shaft and adapted to:

detect, during a reaction type steering of the vehicle in which the steering shaft is coupled to the auto-steering controller, a first manual steering input based on a detected first movement of the steering shaft exceeding a first predetermined limit;

transmit information relating to the first manual steering input to the auto-steering controller;

detect, during a non-reaction type steering of the vehicle in which the steering shaft is decoupled from the auto-steering controller, a second manual steering input based on a detected second movement of the steering shaft exceeding a second predetermined limit, the second predetermined limit being less than the first predetermined limit;

transmit information relating to the second manual steering input to the auto-steering controller; and an auto-guidance system adapted to:

disable, during the reaction type steering, a first automatic steering of the vehicle in response to the information relating to the first manual steering input; and disable, during the non-reaction type steering of the auto-guided vehicle, a second automatic steering in response to detection by the steering sensor of the second movement of the steering shaft exceeding the second predetermined limit.

9. The vehicle of claim 8 wherein the steering sensor is a rotary sensor.

10. The vehicle of claim 8 wherein the steering sensor is a torque sensor.

11. The vehicle of claim 8 wherein the auto-guidance system further comprises:

a controller adapted to transmit automatic steering control signals to the auto-steering controller.

12. An apparatus comprising:

means for detecting, during a reaction mode in which the steering shaft is coupled to an auto-steering controller of the vehicle, a first manual steering input based on a detected first movement of a steering shaft of a vehicle exceeding a first predetermined limit;

means for disabling a first automatic steering of the vehicle in response to the first manual steering input;

means for detecting, during a non-reaction mode in which the steering shaft is decoupled from the auto-steering controller, a second manual steering input based on a detected second movement of the steering shaft above a second predetermined limit indicating the second manual steering input, the second predetermined limit being less than the first predetermined limit; and means for disabling a second automatic steering of the vehicle in response to detecting the second manual steering input by the means for detecting the second manual steering input.

13. The apparatus of claim 12 further comprising:

means for initiating the first automatic steering of the vehicle prior to detecting the first manual steering input; and means for initiating the second automatic steering of the vehicle prior to detecting the second manual steering input.

14. The apparatus of claim 12 further comprising:

means for transmitting first information about the detected first manual steering input to the means for disabling the first automatic steering of the vehicle; and means for transmitting second information about the detected second manual steering input to the means for disabling the second automatic steering of the vehicle.

15. The apparatus of claim 12 wherein the means for disabling the second automatic steering of the vehicle in response to detecting the second manual steering input comprises means for ceasing sending automatic steering control signals.

* * * * *